United States Patent
Chokshi et al.

(10) Patent No.: US 10,949,892 B2
(45) Date of Patent: Mar. 16, 2021

(54) CROSS PLATFORM REWARD EXCHANGE MARKETPLACE PROVIDING AN AUCTION OPERATION

(71) Applicant: International Business Machines Corporation, Armonk, NY (US)

(72) Inventors: Risham Y. Chokshi, North Brunswick, NJ (US); Rachel O. Spratt, Georgetown, TX (US); Robert E. Spratt, Jr., Georgetown, TX (US)

(73) Assignee: International Business Machines Corporation, Armonk, NY (US)

(*) Notice: Subject to any disclaimer, the term of this patent is extended or adjusted under 35 U.S.C. 154(b) by 227 days.

(21) Appl. No.: 15/829,335

(22) Filed: Dec. 1, 2017

(65) Prior Publication Data
US 2019/0172101 A1   Jun. 6, 2019

(51) Int. Cl.
 G06Q 30/02 (2012.01)
 A63F 13/60 (2014.01)
(52) U.S. Cl.
 CPC ......... G06Q 30/0275 (2013.01); A63F 13/60 (2014.09); G06Q 30/0208 (2013.01); G06Q 30/0233 (2013.01)
(58) Field of Classification Search
 CPC ..................................................... G06Q 30/02
 USPC ..................................................... 705/14.27
 See application file for complete search history.

(56) References Cited

U.S. PATENT DOCUMENTS 7,461,022 B1 * 12/2008 Churchill .............. G06Q 10/02
   705/26.3
8,688,563 B2 * 4/2014 Mehew .............. G06Q 30/0601
   705/37

2002/0077890 A1  6/2002 LaPointe et al.
2003/0083943 A1  5/2003 Adams et al.
2007/0099685 A1  5/2007 Van Luchene
2009/0318221 A1 12/2009 Dhunjishaw et al.
(Continued)

FOREIGN PATENT DOCUMENTS

KR   1020140113866 A   9/2014

OTHER PUBLICATIONS

Nunes, A.A.; Galvao, T; Falcao e Cunha, J.; Pitt, J.V., Using Social Networks for Exachanging Valuable Real Time Public Transport Information among Travellers (English), 2011 IEEE 13th Conference on Commerce and Enterprise Computing (pp. 365-370), Sep. 1, 2011 (Year: 2011).*

(Continued)

Primary Examiner — Marilyn G Macasiano
(74) Attorney, Agent, or Firm — Terrile, Cannatti & Chambers, LLP; Stephen A. Terrile

(57) ABSTRACT

A system, method, and computer-readable medium are disclosed for performing a cross platform reward exchange marketplace operation, comprising: creating a cross platform rewards account within a cross platform reward exchange marketplace; transferring a reward from a first entertainment system to the cross platform rewards account; placing the reward up for auction via the cross platform reward exchange marketplace; enabling monitoring of bids relating to the reward up for auction; accepting one of the plurality of bids relating to the reward up for auction; and, performing an exchange transaction via the cross platform reward exchange marketplace, the exchange transaction exchanging the reward up for auction and the one of the plurality of bids.

20 Claims, 8 Drawing Sheets

(56) References Cited

U.S. PATENT DOCUMENTS

| | | | |
|---|---|---|---|
| 2009/0327723 A1* | 12/2009 | Yates | G06Q 30/08 |
| | | | 713/168 |
| 2011/0040638 A1* | 2/2011 | Rabenold | G06Q 30/0277 |
| | | | 705/14.73 |
| 2011/0319157 A1 | 12/2011 | Kuznetsov | |
| 2014/0304102 A1 | 10/2014 | Dhunjishaw et al. | |
| 2017/0032620 A1 | 2/2017 | Lempel et al. | |

OTHER PUBLICATIONS

Duc-Duy Nguyen; Muhammad Intizar Ali, Enabling On-Demand Decentralized IoT Collectability Marketplace using Blockchain an Crowdsensing (English), 2019 Global IoT Summit (GIoTS) (pp. 1-6), Jun. 1, 2019 (Year: 2019).*

Sang-Yeal Han; Moon-Kyo Cho; Mun-Kee Choi, Ubitem: a framework for interactive in location-based gaming environment (English), International Coference on Mobile Business (ICMB'05) (pp. 103-108), Jan. 1, 2005 (Year: 2005).*

List of IBM Patents or Applications Treated as Related.

* cited by examiner

CROSS PLATFORM REWARD EXCHANGE MARKETPLACE PROVIDING AN AUCTION OPERATION

BACKGROUND OF THE INVENTION

Field of the Invention

The present invention relates in general to the field of computers and similar technologies, and in particular to software utilized in this field. Still more particularly, it relates to a method, system and computer-usable medium for performing a cross platform reward exchange marketplace operation for providing an auction operation.

Description of the Related Art

It is known to use information processing systems such as computer systems for entertainment. For example, information processing systems are often used to play games such as video games. There are thousands of different games which are played by millions of users each day.

SUMMARY OF THE INVENTION

A system, method, and computer-readable medium for performing a cross platform reward exchange marketplace operation, comprising: creating a cross platform rewards account within a cross platform reward exchange marketplace; transferring a reward from a first entertainment system to the cross platform rewards account; placing the reward up for auction via the cross platform reward exchange marketplace; enabling monitoring of bids relating to the reward up for auction; accepting one of the plurality of bids relating to the reward up for auction; and, performing an exchange transaction via the cross platform reward exchange marketplace, the exchange transaction exchanging the reward up for auction and the one of the plurality of bids.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
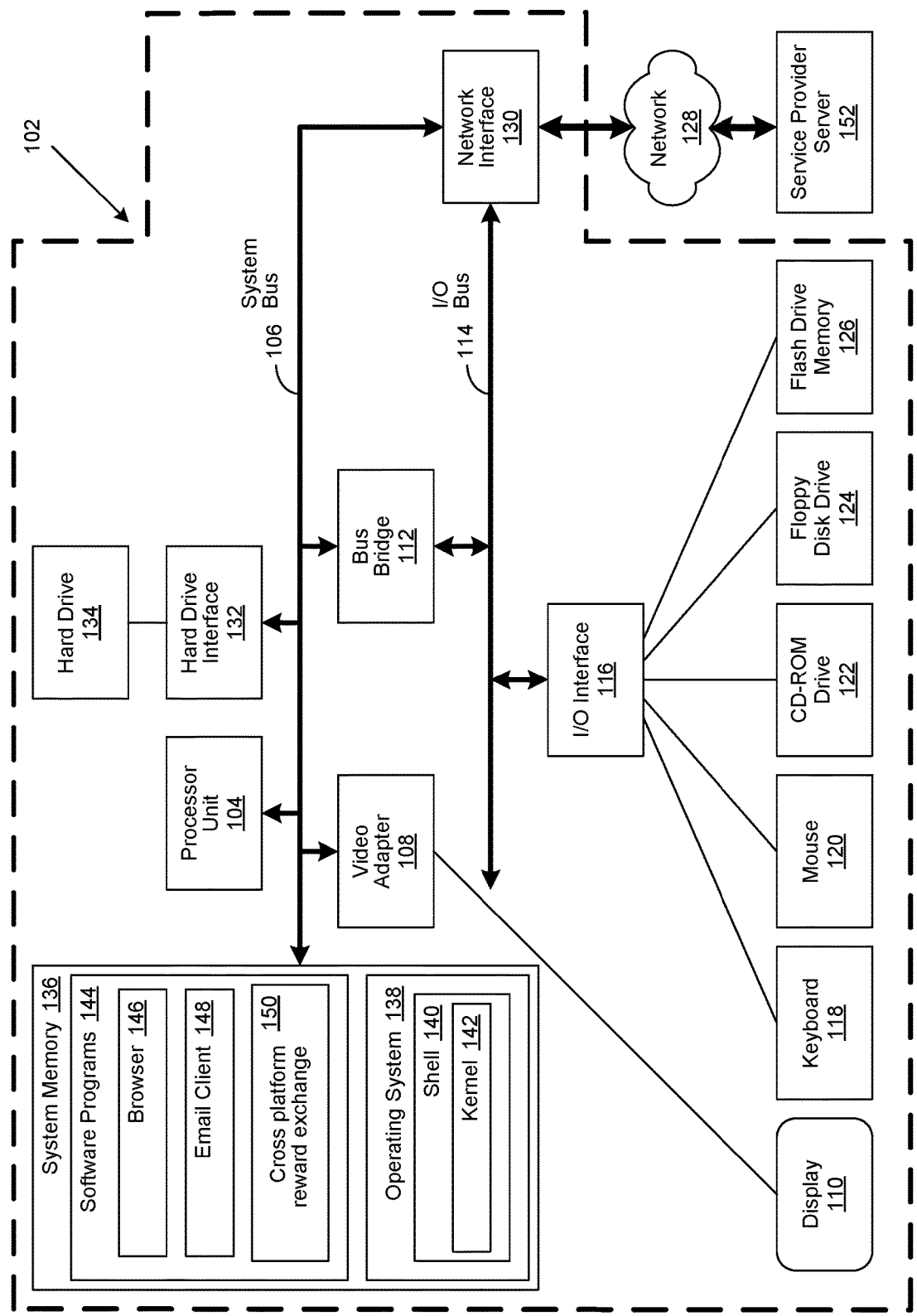
FIG. 1 shows an exemplary client computer in which the present invention may be implemented.

A method, system and computer-usable medium for performing a cross platform reward exchange marketplace operation are disclosed. In certain embodiments, the cross platform reward trade marketplace operation enables a user or users of disparate entertainment platforms to perform transactions across the disparate entertainment platforms. In certain embodiments, the transaction can include exchange of rewards between different game systems. For example, rewards for a first game system could be used to purchase rewards for another game system. In various embodiments, the transaction can be performed in any of a plurality of exchanges. For example, the exchange can include an exchange of money, an exchange for other rewards from the same type of game and an exchange for rewards from another type of game. In certain embodiments, an item associated with a particular game can be auctioned. In certain embodiments, if the trade is performed across different gaming platforms, then the cross platform reward trade marketplace operation could set a price for both the parties so that an equal trade can occur.

The reward exchange marketplace operation allows users to trade their rewards or points for one game with another user's rewards or points from another game. Points could be traded with another player for money, other kinds of rewards in the same game or rewards from a different game. Such a reward exchange marketplace operation allows users who play multiple games to sell their rewards to other users. In certain embodiments, the rewards are set for auction, where other players bid and the seller selects a bid based upon the seller's preference. The bids could be money or other rewards.

Such a reward exchange marketplace operation may be provided as a service which could enable the service provider to receive a share of every rewards exchange transaction performed by the service provider. Additionally, with such a reward exchange marketplace operation, data from the transactions could enable a service provider to analyze data associated with the transactions to identify cross platform transaction trend data. Such cross platform transaction trend data could be monetized in a variety of ways. For example, the cross platform transaction trend data could be used to increase increasing advertising revenue, increase advertising effectiveness, provide analysis data to the organizations originating the transactions, etc.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary computer system 102 in which the present invention may be utilized or implemented. Computer system 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer system 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, computer system 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., computer system 102) to send and receive network messages to the Internet using HyperText Transfer Protocol (HTTP) messaging, thus enabling communication with service provider server 152. In various embodiments, software programs 144 may also include a cross platform reward exchange system 150. In these and other embodiments, the cross platform reward exchange system 150 includes code for implementing the processes described hereinbelow. In one embodiment, computer system 102 is able to download the cross platform reward exchange system 150 from a service provider server 152.

The hardware elements depicted in computer system 102 are not intended to be exhaustive, but rather are representative to highlight components used by the present invention. For instance, computer system 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
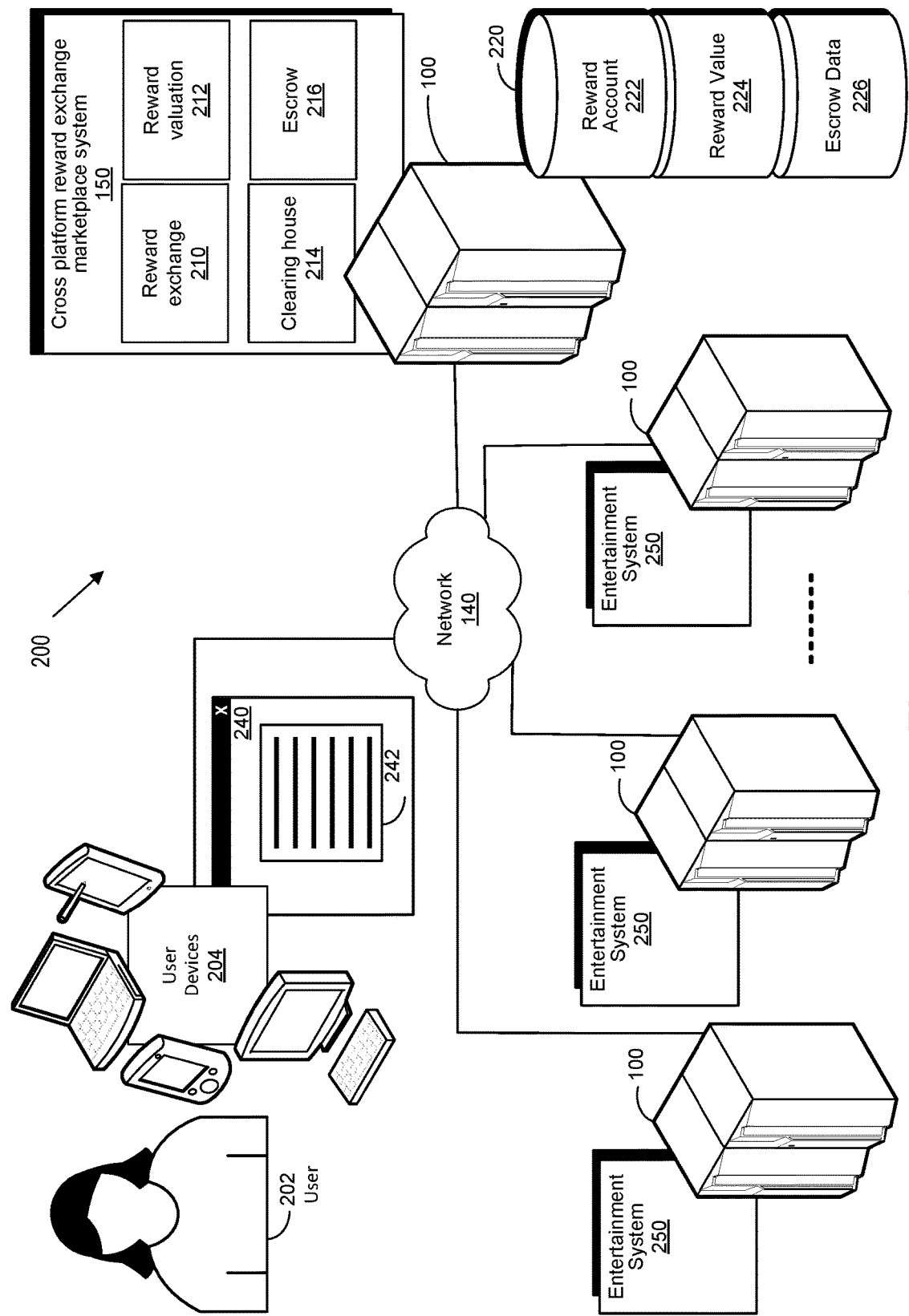
FIG. 2 shows a block diagram of a cross platform reward exchange environment FIGS. 3A and 3B, generally referred to as FIG. 3, show a generalized flowchart of a flow chart of a cross platform reward exchange operation.

FIG. 2 is a block diagram of a cross platform reward exchange environment 200 implemented in accordance with an embodiment of the invention. The cross platform reward exchange environment 200 includes a cross platform reward exchange system 150.

In general, the cross platform reward exchange operation creates a globalized marketplace that is used as a platform to enable trading between and among different gaming systems. In various embodiments, the trading exchanges rewards such as gaming system tools and/or gaming system points. In certain embodiments, the trading includes auction based exchanges where a user can decide on a best bid for a particular reward or set of rewards and can exchange sell the reward or set of rewards with that user in response to receipt of the best bid. This trade or auction could be exchanged for a tool or item from a different gaming environment, different tools in the same gaming platform or currency. If the reward is exchanged for a tool/points from a game in a different environment, then marketplace can determine a market value price that is used to compare items which are being offered for exchange.

In various embodiments, a user 202 interacts with the cross platform reward exchange system 150 to buy and sell rewards from disparate gaming platforms having different reward systems. In various embodiments, the cross platform reward exchange system 150 executes on a hardware processor of a computer system 102. In these and other embodiments, the user 202 may use a user device 204 to interact with the cross platform reward exchange system.

As used herein, a user device 204 refers to an information processing system such as a personal computer, a laptop computer, a tablet computer, a personal digital assistant (PDA), a smart phone, a mobile telephone, or other device that is capable of communicating and processing data. In various embodiments, the user device is configured to present an entertainment user interface 240. In various embodiments, the user device 204 is used to exchange information between the user 202, one or more entertainment systems 250 (such as various gaming system platforms) and the cross platform reward exchange system 150 through the use of a network 140. In various embodiments, each entertainment system 250 executes a respective video game. In certain embodiments, one or more disparate gaming platforms execute on the user device 204. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In certain embodiments, the cross platform reward exchange system 150 includes a reward exchange module 210 which performs the reward exchange operation. In various embodiments, the cross platform reward exchange system 150 includes one or more of a reward valuation module 212, a clearing house module 214 and an escrow module 216. In various embodiments, the cross platform reward exchange environment 200 includes a storage repository 220. The storage repository may be local to the system executing the cross platform reward exchange system 150 or may be executed remotely. In various embodiments, the storage repository includes one or more of a reward account repository 222, a reward value repository 224 and an escrow data repository 226.

In various embodiments, the user device 204 presents a cross platform reward exchange user interface 240. In various embodiments, the cross platform reward exchange user interface provides access to one or more reward exchange options 242. In various embodiments, a cross platform reward exchange user interface 240 may be presented via a website. In various embodiments, the website is provided by the cross platform reward exchange marketplace system 150. In various embodiments, the user 202 may interact with the reward exchange options 242 to control or receive information from the cross platform reward exchange marketplace system 150.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

Many video game type entertainment systems include rewards systems where a user can earn rewards (often in the form of points) when the user meets certain conditions. The rewards may then be redeemed for various items within the video game. With certain games, the rewards are in the form of additional items, tools or characters which may be obtained when certain conditions are met.

In certain embodiments, the cross platform reward exchange system 150 performs a cross platform reward exchange marketplace operation. In certain embodiments, the cross platform reward trade marketplace operation enables a user or users of disparate entertainment platforms to perform transactions across the disparate entertainment platforms. In certain embodiments, the transaction can include exchange of rewards between different game systems. For example, rewards for a first game system could be used to purchase rewards for another game system. In various embodiments, the transaction can be performed in any of a plurality of exchanges. For example, the exchange can include an exchange of money, an exchange for other rewards from the same type of game and an exchange for rewards from another type of game. In certain embodiments, an item associated with a particular game can be auctioned. In certain embodiments, if the trade is performed across different gaming platforms, then the cross platform reward trade marketplace operation could set a price for both the parties so that an equal trade can occur.

The reward exchange marketplace operation allows users to trade their rewards or points for one game with another user's rewards or points from another game. Points could be traded with another player for money, other kinds of rewards in the same game or rewards from a different game. Such a reward exchange marketplace operation allows users who play multiple games to sell their rewards to other users. In certain embodiments, the rewards are set for auction, where other players bid and the seller selects a bid based upon the seller's preference. The bids can be in the form of money or other rewards.

Such a reward exchange marketplace operation may be provided as a service which could enable the service provider to receive a share of every rewards exchange transaction performed by the service provider. Additionally, with such a reward exchange marketplace operation, data from the transactions could enable a service provider to analyze data associated with the transactions to identify cross platform transaction trend data. Such cross platform transaction trend data could be monetized in a variety of ways. For example, the cross platform transaction trend data could be used to increase increasing advertising revenue, increase advertising effectiveness, provide analysis data to the organizations originating the transactions, etc.

In certain embodiments, the cross platform rewards exchange system 150 includes a cross platform reward valuation module 212. The cross platform reward valuation module 212 values rewards for a plurality of disparate gaming platforms. Rewards may be valued based upon commonality of occurrence, difficulty in obtaining and geographic diversity. For example, certain rewards may occur infrequently within a particular game. Such a reward would have a higher valuation than a reward that occurs very frequently. Also, for example, certain rewards may be very difficult to obtain, either in terms of skill level necessary to obtain or time required to obtain. Such a reward would have a higher valuation than a reward that is easy to obtain, either in terms of skill level or time required. Also, for example, in an augmented reality type of game, a particular reward may only be available in certain locals, geographies or topographies. Such a reward might have a higher value in other locals, geographies or topographies. In certain embodiments, the cross platform reward valuation module 212 identifies market value for each reward for each disparate gaming platform. In various embodiments, market value is identified based on an analysis of completed auction value for the same or similar rewards as well as a gaming value for a particular reward within the particular gaming system. So if a game is popular and it is very difficult to obtain a particular reward within in the game, the market value price for the particular reward will be more. Rewards from less popular games or that are easier to obtain will be less. In certain embodiments, the market values for rewards across disparate gaming platforms are normalized to provide cross platform normalized market values. Having cross platform normalized values facilitate cross platform exchanges of rewards.

Figure 3A:
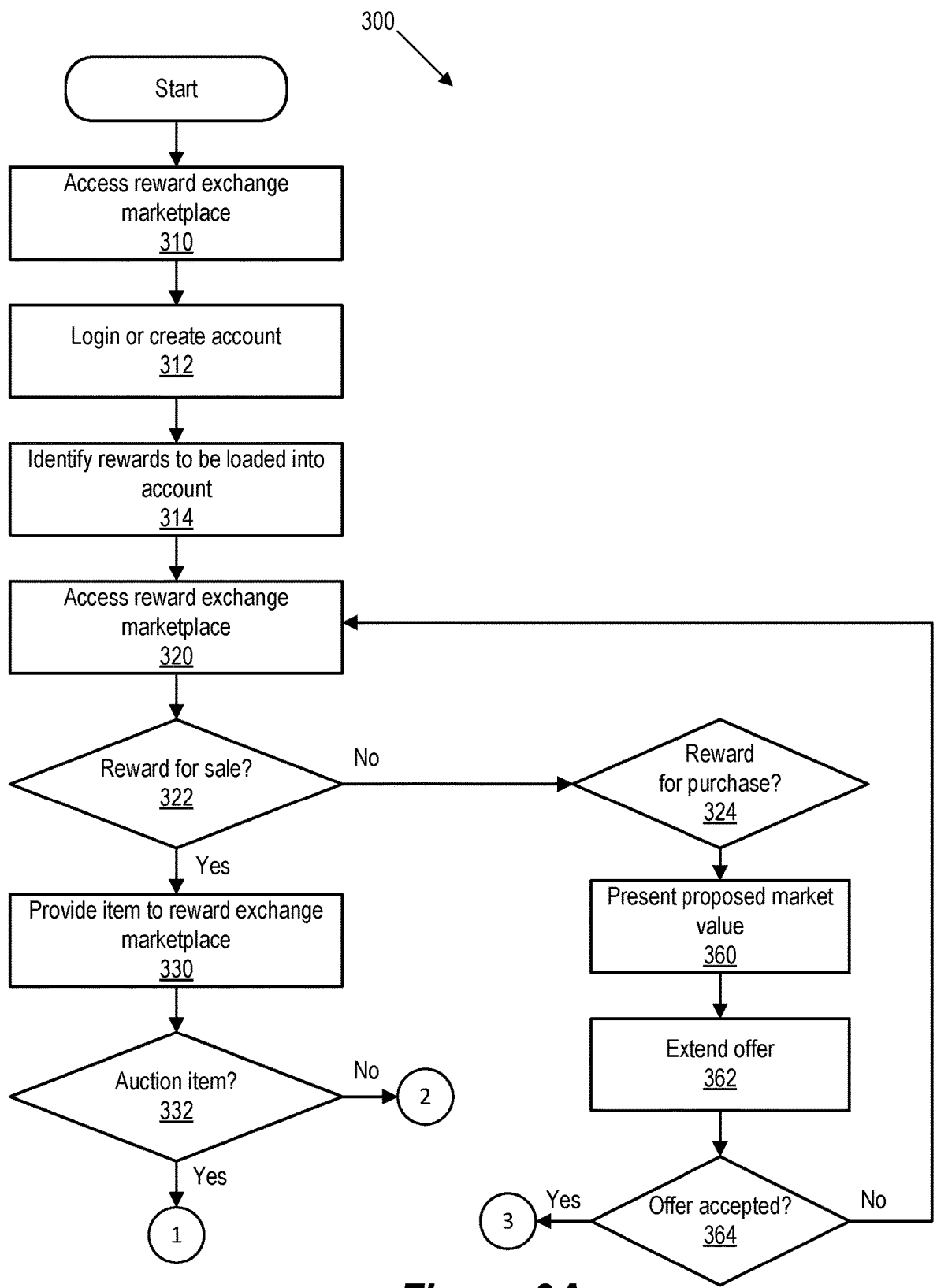
Figure 3B:
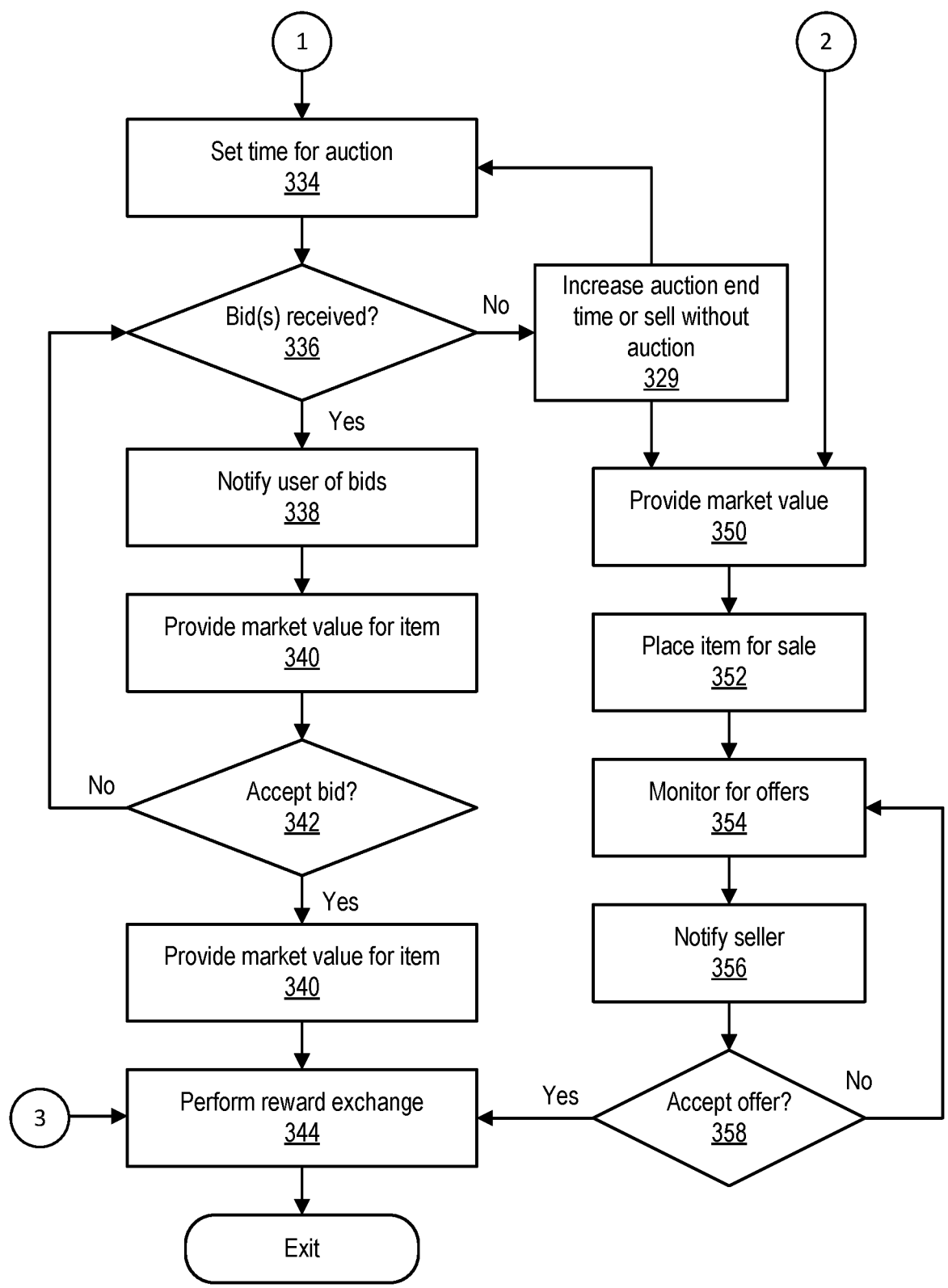

Referring to FIGS. 3A and 3B, a flow chart of a cross platform reward exchange operation 300 is shown. In general, the cross platform reward exchange operation 300 creates a globalized marketplace that is used as a platform to enable trading between and among different gaming systems. In various embodiments, the trading exchanges rewards such as gaming system tools and/or gaming system points. In certain embodiments, the trading includes auction based exchanges where a user can decide on a best bid for a particular reward or set of rewards and can exchange sell the reward or set of rewards with that user in response to receipt of the best bid. This trade or auction could be exchanged for a tool or item from a different gaming environment, different tools in the same gaming platform or currency. If the reward is exchanged for a tool or points from a game in a different environment, then marketplace can determine a market value price that is used to compare items which are being offered for exchange.

More specifically, the cross platform reward exchange operation beings at step 310 with a user accessing the reward exchange marketplace (which is provided by the cross platform reward exchange system 150) and either logging in to their reward exchange account or creating a new reward exchange account. The user is then associated with their reward exchange account via a reward exchange account identifier. Next at step 312, the user associates some or all of their gaming accounts with their reward exchange account. Next at step 314, the user identifies rewards to be loaded and loads the identified rewards from some or all of the gaming accounts to their reward exchange account.

Next, at step 320, the user accesses the reward exchange marketplace and identifies an item for sale or purchase. The cross platform reward exchange operation determines whether the item is for sale at step 322. If not, the cross platform reward exchange operation determines whether the item is for purchase at step 324.

If at step 322, the cross platform reward exchange operation determines the item is for sale, then the user provides the item to the reward exchange marketplace at step 330. Next the user indicates whether the item for sale should be auctioned at step 332. If yes, then the user sets a time for the auction to end at step 324. The reward exchange marketplace monitors the auction and determines whether a bid is received at step 326. The user is then notified of the bid at step 328. If no bid is received within the predefined auction time, then the user is provided with an option of either increasing the auction end time or to sell the item without an auction component at step 329.

If the reward exchange marketplace determines that a bid or bids were received at step 326, then the user is provided with a market value for the item at step 340. The user is then provided with an option of whether to accept a bid at step 342. When the user accepts the bid, then the reward exchange marketplace performs a reward exchange operation at step 344. During the reward exchange operation 344, the item is provided to the person whose bid was accepted and the bid amount is transferred to the user. In certain embodiments, the marketplace exchange operation identifies a type of gaming account that is associated with the bid and transfers the bid amount directly to the gaming account of the user. Additionally, in certain embodiments, the marketplace exchange operation identifies a type of gaming account that is associated with the item being auctioned and transfers the item directly to the gaming account of the highest bidder.

If at step 332, the cross platform reward exchange operation determines that the item for sale is not to be auctioned, then the seller is provided with a market value for the item at step 350. The cross platform reward exchange operation then places the item for sale within the exchange marketplace at step 352 and monitors the item to determine whether any offers for purchase at received at step 354. If there is an offer for purchase, the seller is notified at step 356. The seller then indicates whether they accept the request at step 358. If not, then the marketplace continues to monitor the item to determine whether any other offers for purchase are received. When the user accepts the offer, then the reward exchange marketplace performs a reward exchange operation at step 344. During the reward exchange operation 344, the item is provided to the person whose offer was accepted and the offer amount is transferred to the user. In certain embodiments, the marketplace exchange operation identifies a type of gaming account that is associated with the offer and transfers the offer amount directly to the gaming account of the user. Additionally, in certain embodiments, the marketplace exchange operation identifies a type of gaming account that is associated with the item being sold and transfers the item directly to the gaming account of the accepted offer.

When the cross platform reward exchange operation determines whether the item is for purchase at step 324, a user is presented with a proposed market value of the item for purchase at step 360. The proposed market value is a normalized market value for cross platform exchanges. The user can use this proposed market value to make an offer for the item at step 362. The offer can be an offer for an exchange of rewards or an offer for purchase using money. Next, at step 364, the cross platform reward exchange operation determines whether the offer was accepted by the seller of the item. If the offer is not accepted, then the cross platform reward exchange operation returns to step 320. If the offer was accepted, then the reward exchange marketplace performs a reward exchange operation at step 344. During the reward exchange operation 344, the item is provided to the purchaser whose offer was accepted and the offer amount is transferred to the seller of the item. In certain embodiments, the marketplace exchange operation identifies a type of gaming account that is associated with the offer and transfers the offer amount directly to the gaming account of the user. Additionally, in certain embodiments, the marketplace exchange operation identifies a type of gaming account that is associated with the item being sold and transfers the item directly to the gaming account of the accepted offer.

Figure 4:
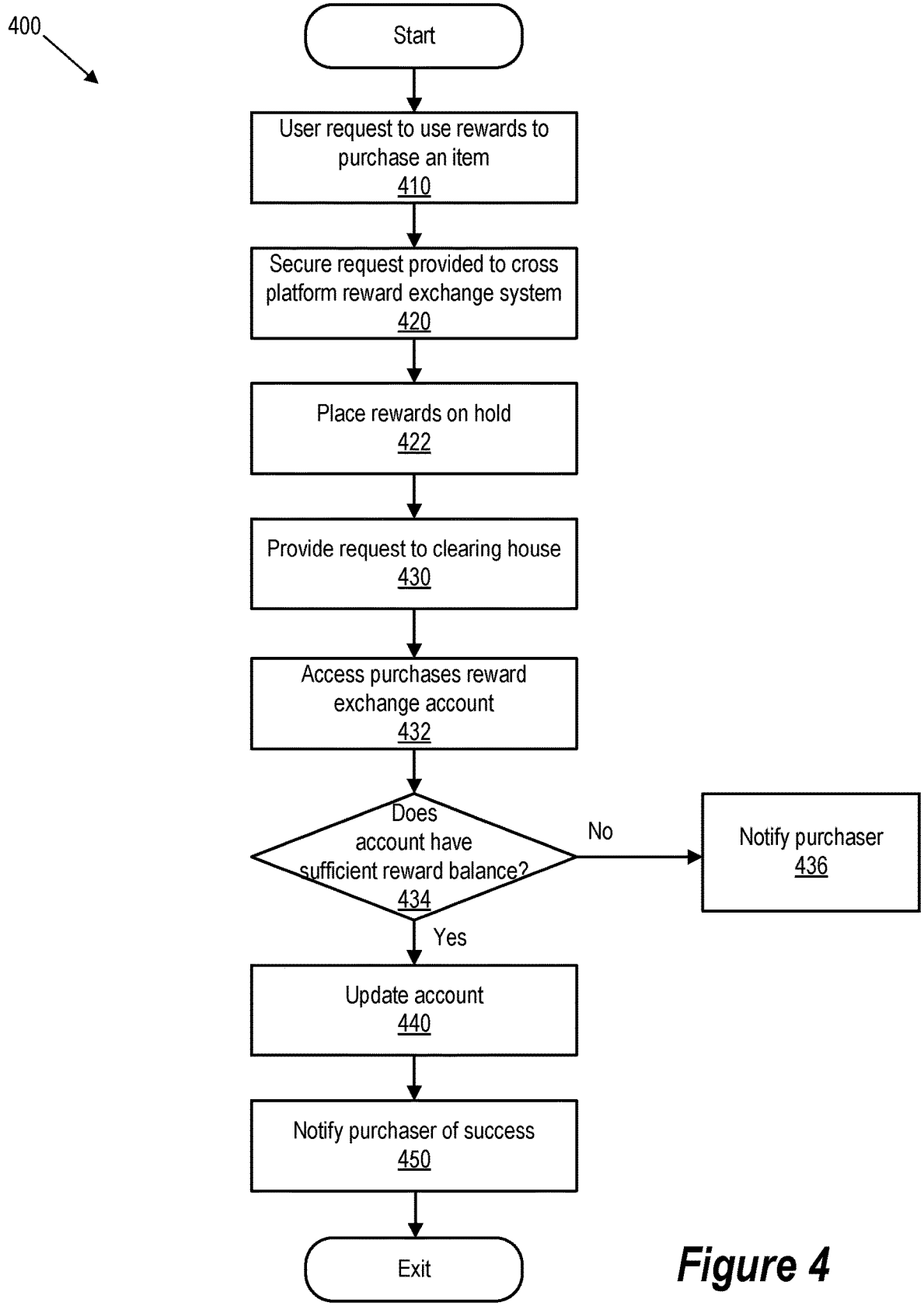
FIG. 4 shows a flow chart of a cross platform reward exchange purchase operation.

Referring to FIG. 4, a flow chart of a cross platform reward exchange purchase operation 400 is shown. More specifically, the cross platform reward exchange purchase operation begins at step 410 with a user requesting to use their rewards from their gaming account to purchase an item. Next at step 420, a secure request is provided to the cross platform reward exchange system 150 indicating the request to use their rewards. In certain embodiments, the secure request may be via a Hypertext Transfer Protocol Secure (HTTPS) message generated by the user device 204 and provided to the cross platform reward exchange system 150. Next at step 422, the cross platform reward exchange system 150 places a hold on the rewards of the user associated with the purchase request. The request is then provided to a clearing house module 214 of the cross platform reward exchange system 150 at step 430. The clearing house module 214 is associated with each user's reward exchange account. In certain embodiments, the association is performed when a user registers with the cross platform reward exchange system 150. The clearing house module 214 performs a reward escrow operation. The reward escrow operation prevents double spending of rewards and updates a user's reward exchange account when a purchase is initiated. Next at step 432, the cross platform reward exchange system 150 accesses the purchaser's reward exchange account and determines whether the purchaser has a sufficient reward balance to complete the requested purchase at step 434. If not, then the cross platform reward exchange system 150 so notifies the purchaser at step 436. In certain embodiments, the notification is via a HTTPS message to the purchaser.

If so, then the purchaser's reward exchange account is updated to reflect the purchase at step 440. Also, in certain embodiments, the clearing house module 214 releases the escrowed rewards to finalize the reward escrow operation. In certain embodiments, a secure request is sent to the clearing house module 214 to deduct the rewards from the gaming platform from which the reward originated and an updated reward value is provided to the gaming platform to reflect the deducted rewards. Next, the cross platform reward exchange system 150 notifies the purchaser of a successful purchase at step 450. In certain embodiments, the notification is via a HTTPS message to the purchaser.

Figure 5:
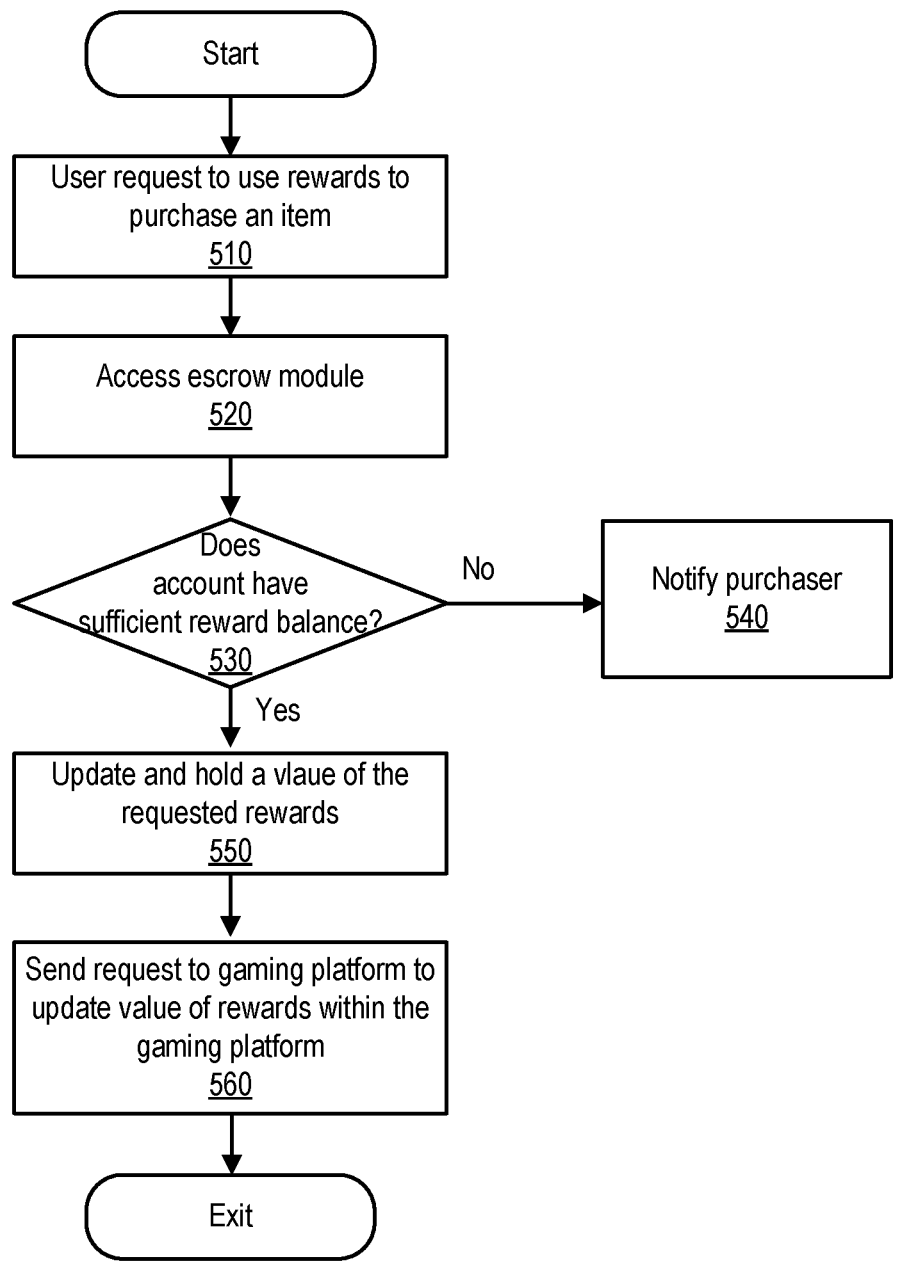
FIG. 5 shows a flow chart of a cross platform reward exchange purchase escrow operation.

Referring to FIG. 5, a flow chart of a cross platform reward exchange purchase escrow operation 500 is shown. In certain embodiments, it may be desirable to provide enhanced trust around a cross platform reward exchange operation. In such cases, the cross platform reward exchange system 150 can implement a cross platform reward exchange purchase escrow operation which is integrated with the cross platform reward exchange purchase system. In certain embodiments, the cross platform reward exchange purchase escrow operation may be implemented via an integrated escrow module 214.

The cross platform reward exchange purchase escrow operation 500 starts at step 510 when a user requests to use their rewards from their reward exchange account. Next, at step 520, the cross platform reward exchange purchase system 150 accesses the integrated escrow module 216 and requests updated values and refreshes an in-build system to check for deduction of rewards. The in-build system works like an exchange place such as barter system where deduction of rewards or money is made upon purchase of a reward within the cross platform exchange purchase system. The cross platform reward exchange purchase system 150 then determines whether a user's reward exchange account has enough rewards to cover the user request at step 530. If not, then the cross platform reward exchange purchase system 150 provides a message to the user that there are insufficient rewards to accomplish the request at step 540. If so, then at step 550, the cross platform reward exchange purchase system 150 updates and holds a value of the requested rewards within the integrated escrow module 216. The cross platform reward exchange purchase system 150 then sends a request to the gaming platform associated with the escrowed rewards to update the value of the rewards within the gaming platform at step 560.

Figure 6A:
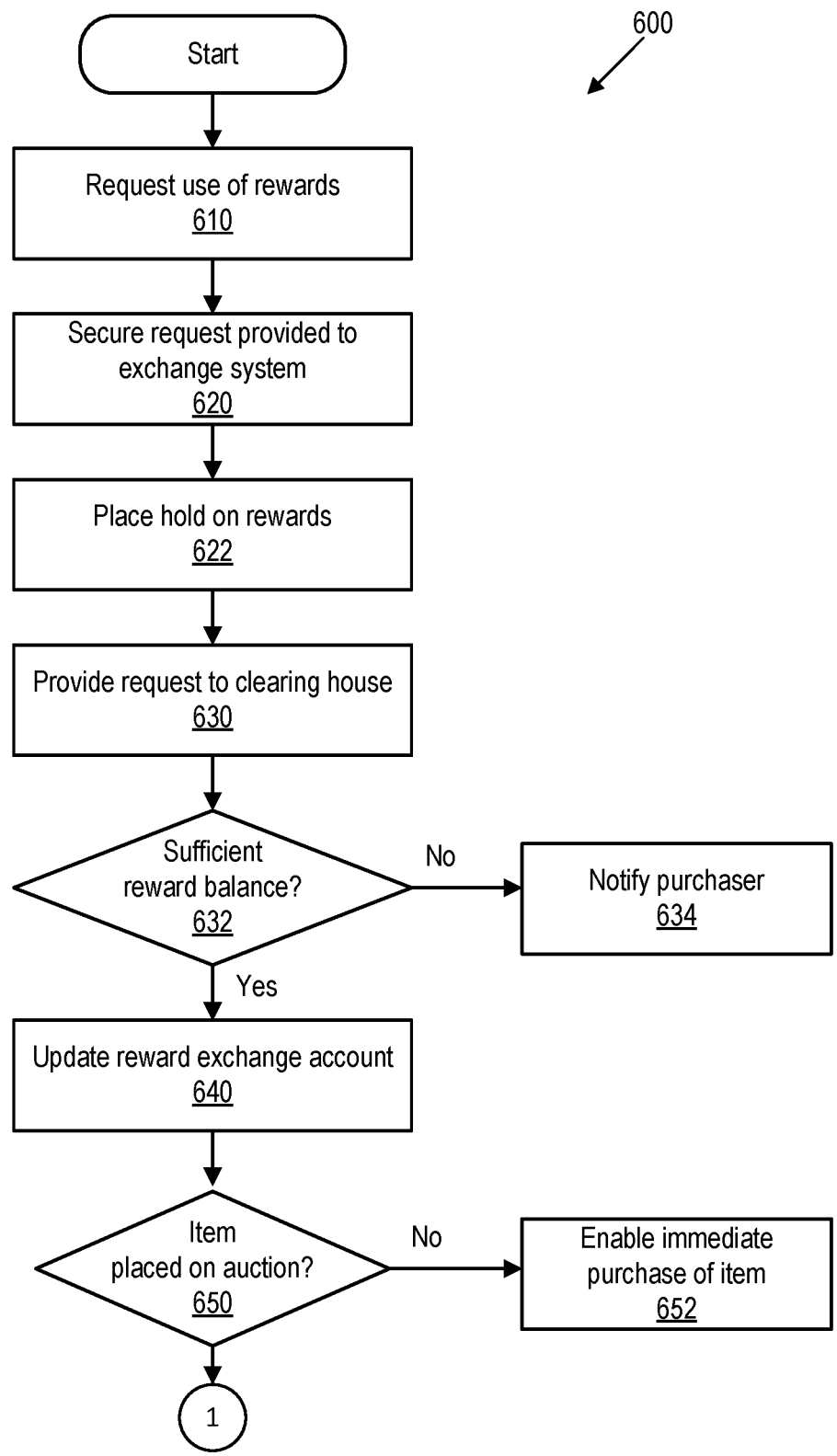
FIGS. 6A and 6B, generally referred to as FIG. 6, show a flow chart of a cross platform reward exchange purchase auction operation.
Figure 6B:
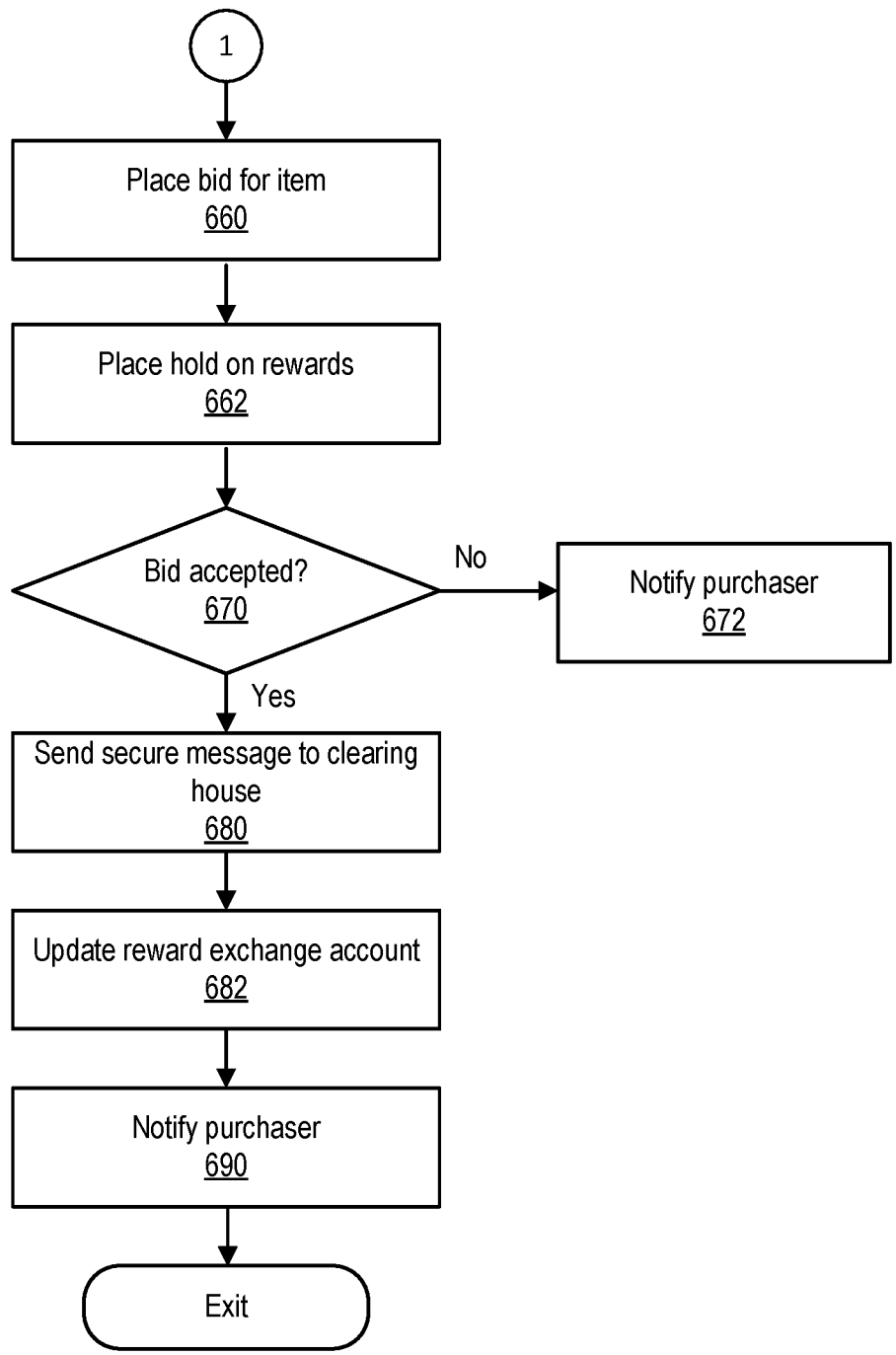

Referring to FIGS. 6A and 6B, a flow chart of a cross platform reward exchange purchase auction operation 600 is shown. More specifically, the cross platform reward exchange purchase auction operation 600 begins at step 610 with a user requesting to use their rewards from their gaming account to purchase an item. Next at step 620, a secure request is provided to the cross platform reward exchange system 150 indicating the request to use their rewards. In certain embodiments, the secure request may be via a HTTPS message generated by the user device 204 and provided to the cross platform reward exchange system 150. Next at step 622, the cross platform reward exchange system 150 places a hold on the rewards of the user associated with the purchase request. The request is then provided to a clearing house module 216 of the cross platform reward exchange system 150 at step 630. The clearing house module 216 is associated with each user's reward exchange account. In certain embodiments, the association is performed when a user registers with the cross platform reward exchange system 150. The clearing house module 216 performs a reward escrow operation. The reward escrow operation prevents double spending of rewards and updates a user's reward exchange account when a purchase is initiated. Next at step 632, the cross platform reward exchange system 150 accesses the purchaser's reward exchange account to determine whether the purchaser has a sufficient reward balance to complete the requested purchase. If not, then the cross platform reward exchange system 150 so notifies the purchaser at step 634. In certain embodiments, the notification is via a HTTPS message to the purchaser. If so, then the purchaser's reward exchange account is updated to reflect the purchase at step 640.

Next, at step 650, the cross platform reward exchange system 150 determines whether the requested item has been placed on auction. If not, then the item may be purchased immediately by the user at step 652. In certain embodiments, when completing the purchase, the clearing house module 216 releases the escrowed rewards to finalize the reward escrow operation. In certain embodiments, a secure request is sent to the clearing house module 216 to deduct the rewards from the gaming platform from which the reward originated and an updated reward value is provided to the gaming platform to reflect the deducted rewards. Next, the cross platform reward exchange system 150 notifies the purchaser of a successful purchase. In certain embodiments, the notification is via a HTTPS message to the purchaser.

If the requested item has been placed on auction, then the user places a bid for the item at step 660. A hold is placed on the rewards contained within the clearing house module corresponding to the bid amount at step 662. Next, at step 670, the cross platform reward exchange system 150 determines whether the bid was accepted by the seller. If not, a secure message is sent to the user indicating that the offer was rejected at step 672 and the held rewards are released. In certain embodiments, the secure message may be a HTTPS message. If the bid was accepted, then a secure message is sent to the clearing house indicating that the offer was confirmed at step 680. Next, the purchaser's reward exchange account is updated to reflect the purchase at step 682. Also, in certain embodiments, the clearing house module 216 releases the escrowed rewards to finalize the reward escrow operation. In certain embodiments, a secure request is sent to the clearing house module 216 to deduct the rewards from the gaming platform from which the reward originated and an updated reward value is provided to the gaming platform to reflect the deducted rewards. Next, the cross platform reward exchange system 150 notifies the purchaser of a successful auction purchase at step 690 and the operation completes. In certain embodiments, the notification is via a HTTPS message to the purchaser.

Although the present invention has been described in detail, it should be understood that various changes, substitutions and alterations can be made hereto without departing from the spirit and scope of the invention as defined by the appended claims.

What is claimed is:

1. A computer-implementable method for performing a cross platform reward exchange marketplace operation within a cross platform reward exchange environment, the cross platform reward exchange environment comprising a cross platform reward exchange system and a plurality of entertainment systems communicating with the cross platform reward exchange system via a network, comprising:

creating a cross platform rewards account within a cross platform reward exchange marketplace, the cross platform reward exchange marketplace being provided via the cross platform reward exchange system executing on an information handling system, the cross platform reward exchange system providing a platform for enabling trading between and among a plurality of different entertainment systems, each of the plurality of different entertainment systems comprising a respective gaming platform, each respective gaming platform executing on a respective user device, each respective gaming platform being disparate, each respective gaming platform having a different respective reward system;

transferring a reward from a first entertainment system to the cross platform rewards account;

placing the reward up for auction via the cross platform reward exchange marketplace;

enabling monitoring of bids relating to the reward up for auction;

accepting one of the plurality of bids relating to the reward up for auction; and, performing an exchange transaction via the cross platform reward exchange marketplace, the exchange transaction exchanging the reward up for auction and the one of the plurality of bids, the exchange transaction comprising receiving the bid amount at the cross platform reward exchange marketplace and providing the bid amount from the cross platform reward exchange marketplace to the user device of the first entertainment system.

2. The method of claim 1, wherein:
the reward up for auction and the one of the plurality of bids are from disparate gaming platforms.

3. The method of claim 1, wherein:
the exchange transaction transfers the reward from the cross platform rewards account to another cross platform rewards account, the another cross platform rewards account being associated with an owner of the one of the plurality of bids and transfers the one of the plurality of bids from the another cross platform rewards account to the cross platform rewards account.

4. The method of claim 1, wherein:
the first entertainment system comprises a first game system, the second entertainment system comprises a second game system and the exchange transaction includes exchanging of rewards between the first game system and the second game system via the cross platform reward exchange marketplace.

5. The method of claim 4, wherein:
the one of the plurality of bids comprises at least one of a monetary bid, a reward from a same type of game and a reward from another type of game; and,
the exchange transaction includes at least one of an exchange of money for the reward, an exchange for another reward from a same type of game for the reward and an exchange for a reward from another type of game for the reward.

6. The method of claim 1, further comprising:
determining an exchange market value for the reward up for bid, the exchange market value being based upon at least one of commonality of occurrence, difficulty in obtaining and geographic diversity; and,
determining an exchange market value for each of the plurality of bids.

7. A system comprising:
a processor;
a data bus coupled to the processor; and
a non-transitory, computer-readable storage medium embodying computer program code for performing a cross platform reward exchange marketplace operation within a cross platform reward exchange environment, the cross platform reward exchange environment comprising a cross platform reward exchange system and a plurality of entertainment systems communicating with the cross platform reward exchange system via a network, the non-transitory, computer-readable storage medium being coupled to the data bus, the computer program code interacting with a plurality of computer operations and comprising instructions executable by the processor and configured for:

creating a cross platform rewards account within a cross platform reward exchange marketplace, the cross platform reward exchange marketplace being provided via the cross platform reward exchange system executing on an information handling system, the cross platform reward exchange system providing a platform for enabling trading between and among a plurality of different entertainment systems, each of the plurality of different entertainment systems comprising a respective gaming platform, each respective gaming platform executing on a respective user device, each respective gaming platform being disparate, each respective gaming platform having a different respective reward system;

transferring a reward from a first entertainment system to the cross platform rewards account;

placing the reward up for auction via the cross platform reward exchange marketplace;

enabling monitoring of bids relating to the reward up for auction;

accepting one of the plurality of bids relating to the reward up for auction, the one of the plurality of bids comprising a corresponding bid amount; and, performing an exchange transaction via the cross platform reward exchange marketplace, the exchange transaction exchanging the reward up for auction and the one of the plurality of bids, the exchange transaction comprising receiving the bid amount at the cross platform reward exchange marketplace and providing the bid amount from the cross platform reward exchange marketplace to the user device of the first entertainment system.

8. The system of claim 7, wherein:

the reward up for auction and the one of the plurality of bids are from disparate gaming platforms.

9. The system of claim 7, wherein:

the exchange transaction transfers the reward from the cross platform rewards account to another cross platform rewards account, the another cross platform rewards account being associated with an owner of the one of the plurality of bids and transfers the one of the plurality of bids from the another cross platform rewards account to the cross platform rewards account.

10. The system of claim 7, wherein:

the first entertainment system comprises a first game system, the second entertainment system comprises a second game system and the exchange transaction includes exchanging of rewards between the first game system and the second game system via the cross platform reward exchange marketplace.

11. The system of claim 10, wherein:

the one of the plurality of bids comprises at least one of a monetary bid, a reward from a same type of game and a reward from another type of game; and, the exchange transaction includes at least one of an exchange of money for the reward, an exchange for another reward from a same type of game for the reward and an exchange for a reward from another type of game for the reward.

12. The system of claim 7, wherein the instructions are further configured for:

determining an exchange market value for the reward up for bid, the exchange market value being based upon at least one of commonality of occurrence, difficulty in obtaining and geographic diversity; and, determining an exchange market value for each of the plurality of bids.

13. A non-transitory, computer-readable storage medium embodying computer program code for performing a cross platform reward exchange marketplace operation within a cross platform reward exchange environment, the cross platform reward exchange environment comprising a cross platform reward exchange system and a plurality of entertainment systems communicating with the cross platform reward exchange system via a network, the computer program code comprising computer executable instructions configured for:

creating a cross platform rewards account within a cross platform reward exchange marketplace, the cross platform reward exchange marketplace being provided via the cross platform reward exchange system executing on an information handling system, the cross platform reward exchange system providing a platform for enabling trading between and among a plurality of different entertainment systems, each of the plurality of different entertainment systems comprising a respective gaming platform, each respective gaming platform executing on a respective user device, each respective gaming platform being disparate, each respective gaming platform having a different respective reward system;

transferring a reward from a first entertainment system to the cross platform rewards account;

placing the reward up for auction via the cross platform reward exchange marketplace;

enabling monitoring of bids relating to the reward up for auction;

accepting one of the plurality of bids relating to the reward up for auction; and, performing an exchange transaction via the cross platform reward exchange marketplace, the exchange transaction exchanging the reward up for auction and the one of the plurality of bids, the exchange transaction comprising receiving the bid amount at the cross platform reward exchange marketplace and providing the bid amount from the cross platform reward exchange marketplace to the user device of the first entertainment system.

14. The non-transitory, computer-readable storage medium of claim 13, wherein:

the reward up for auction and the one of the plurality of bids are from disparate gaming platforms.

15. The non-transitory, computer-readable storage medium of claim 13, wherein:

the exchange transaction transfers the reward from the cross platform rewards account to another cross platform rewards account, the another cross platform rewards account being associated with an owner of the one of the plurality of bids and transfers the one of the plurality of bids from the another cross platform rewards account to the cross platform rewards account.

16. The non-transitory, computer-readable storage medium of claim 13, wherein:

the first entertainment system comprises a first game system, the second entertainment system comprises a second game system and the exchange transaction includes exchanging of rewards between the first game system and the second game system via the cross platform rewards account.

17. The non-transitory, computer-readable storage medium of claim 16, wherein:

the one of the plurality of bids comprises at least one of a monetary bid, a reward from a same type of game and a reward from another type of game; and, the exchange transaction includes at least one of an exchange of money for the reward, an exchange for another reward from a same type of game for the reward and an exchange for a reward from another type of game for the reward.

18. The non-transitory, computer-readable storage medium of claim 13, wherein the instructions are further configured for:
   determining an exchange market value for the reward up for bid, the exchange market value being based upon at least one of commonality of occurrence, difficulty in obtaining and geographic diversity; and,
   determining an exchange market value for each of the plurality of bids.

19. The non-transitory, computer-readable storage medium of claim 13, wherein:
   the computer executable instructions are deployable to a client system from a server system at a remote location.

20. The non-transitory, computer-readable storage medium of claim 13, wherein:
   the computer executable instructions are provided by a service provider to a user on an on-demand basis.

* * * * *